United States Patent Office 3,373,349
Patented Mar. 12, 1968

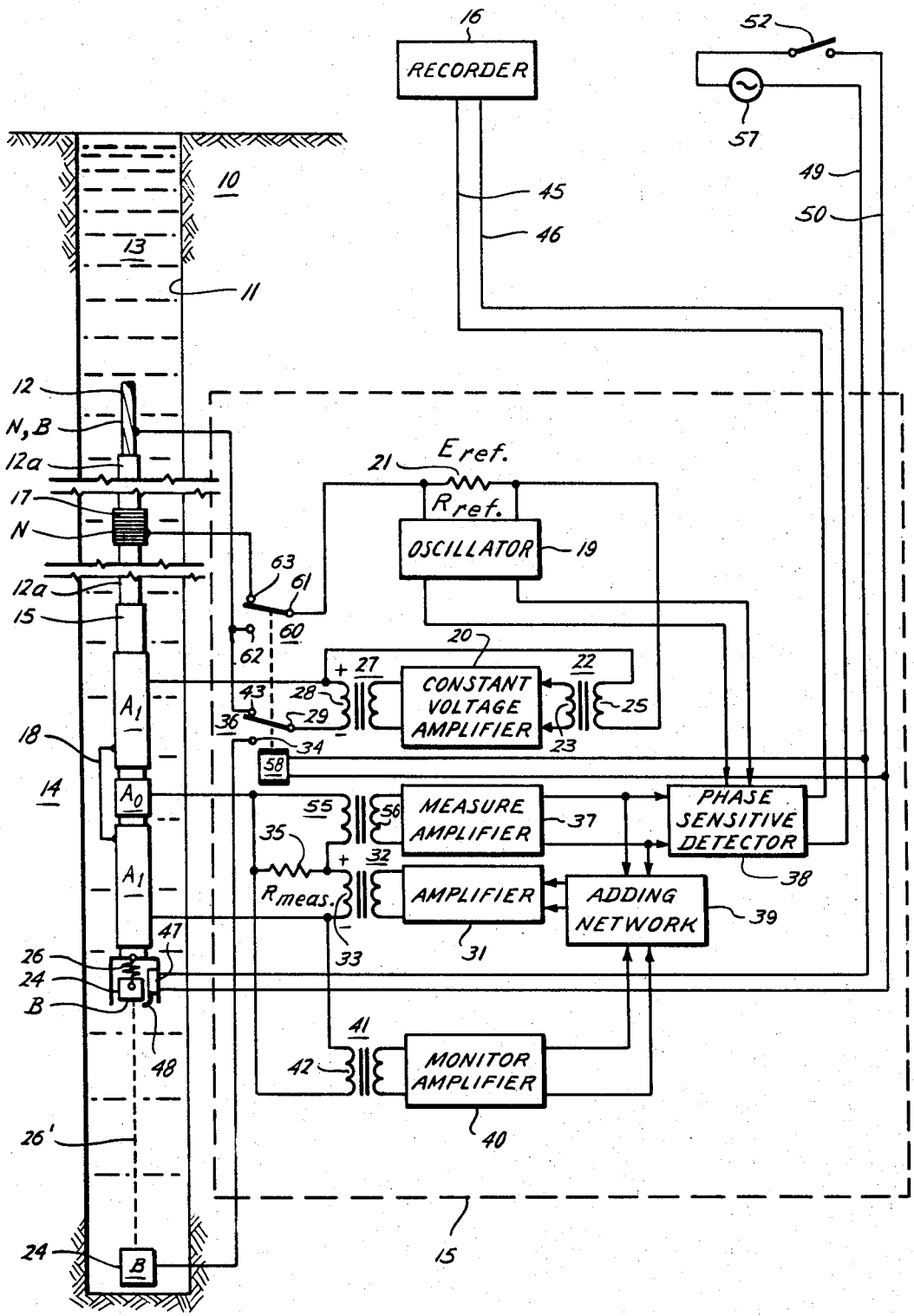

3,373,349
WELL LOGGING METHODS AND APPARATUS FOR SOLVING THE POTENTIAL REFERENCE PROBLEM IN ELECTRODE TYPE INVESTIGATING APPARATUS
Denis R. Tanguy, Houston, Tex., assignor, by mesne assignments, to Schlumberger Technology Corporation, Houston, Tex., a corporation of Texas
Filed July 14, 1965, Ser. No. 471,808
13 Claims. (Cl. 324—10)

ABSTRACT OF THE DISCLOSURE

In accordance with an illustrative embodiment of the invention, a focused electrode array is maintained at a relatively constant voltage with respect to a remote potential reference electrode located above the focused electrode array. For investigating most of the borehole, a current return electrode is located below the constant voltage electrode array so that the constant voltage electrodes can electrically shield the potential reference electrode from the current return electrode. To allow for investigating the bottom portion of the borehole, the lower current return electrode is held in a close proximity position below the focused electrode array and a current return electrode located above the focused electrode array is utilized for returning the current emitted by the focused electrode array. Then, when the focused electrode array is a sufficient interval from the bottom of the borehole, the lower current return electrode is released to fall a fixed distance below the focused electrode array. The current return path is then switched from the upper current return electrode to the lower current return electrode for investigating the remainder of the borehole.

---

This invention relates to electrical apparatus for investigating subsurface earth formations traversed by a borehole and, more particularly, to such apparatus of a type utilizing current emitting electrodes which are lowered into the borehole for passing electrical current into the subsurface earth formations for obtaining indications of the resistivity or conductivity characteristics thereof.

One manner in which subsurface earth formations are investigated is by obtaining electrical resistivity or conductivity logs by the so-called "focused" measurements. Such "focused" measurements are obtained by automatically controlling the potential and current distribution in the vicinity of an electrical logging array passed through such borehole so as to obtain desired current flow patterns. In a focused system, a survey current is emitted by a principal survey current emitting electrode disposed in the borehole and this survey current is confined to a path substantially perpendicular to the borehole axis by focusing currents emitted from nearby electrodes on opposite sides of the principal survey electrode.

When investigating subsurface earth formations by obtaining electrical resistivity or conductivity measurements, either the voltage is maintained constant and the current variations measured or the current is maintained constant and the voltage variations measured, or some combination of the two. Whichever method is utilized, it is frequently desirable to have a constant errorless reference voltage approximating zero volts in the downhole electrical circuitry so that the resistivity or conductivity value may be more accurately determined. To obtain this constant errorless reference voltage, a remote potential reference electrode is connected to the downhole electrical circuitry. This remote potential reference electrode cannot be near the survey and focusing electrodes because of the relatively high potential in the vicinity of these electrodes, nor should it be near the current return electrode for the survey and focusing currents because of possible voltage gradients set up by the survey and focusing currents in the vicinity of this current return electrode. Thus, it will be desirable to have the potential reference electrode as far as possible from the survey and focusing electrodes and the current return electrode for the survey and focusing currents.

However, it would be undesirable to place the potential reference electrode at a great distance below the survey and focusing emitting and return electrodes, because of the additional length of the investigating equipment and the impossibility of investigating the bottom of the borehole, since the potential reference electrode would touch bottom while, at the same time, the remainder of the investigating equipment would be disposed far above the potential reference electrode in the borehole. On the other hand, if the potential reference electrode is placed at or near the surface of the earth, serious problems arise because of induced voltages in the conductor connecting the potential reference electrode with the electrical circuitry in the downhole investigating equipment due to mutual inductance between cable conductors along the great length of cable running from the downhole investigating equipment to the surface.

Thus, it is desirable to place the potential reference electrode above the survey and focusing electrodes a reasonable distance which is not so short that the potential reference electrode is unduly influenced by the current emitting and return electrodes of the investigating system, or not so long that undesired voltage components are induced into the conductor connecting the potential reference electrode with the electrical circuitry in the downhole investigating equipment.

Placing the potential reference electrode a reasonable distance above the other electrodes of the investigating system maintains the potential reference electrode free of erroneous voltage components for most operating conditions. However, under certain operating conditions, as for example when there are earth strata having a very high resistivity, ordinary means of investigating subsurface earth formations fail to provide accurate resistivity or conductivity measurements. For example, the survey current emitted from a non-focused investigating system will not be able to penetrate into the high resistivity earth strata to provide resistivity or conductivity indications of the earth formations surrounding that portion of the borehole. Instead, most of the survey current will travel through the borehole, thus providing erroneous resistivity or conductivity readings.

Thus, it is desirable to provide a focused type of electrical investigating system to investigate earth strata having the above-mentioned characteristics, so that the survey current will penetrate the high resistivity earth strata.

In earth strata of this type, problems may arise in focused type electrode systems wherein the potential reference electrode is located a reasonable distance above the survey and focusing electrodes and the current return electrode, and the current return electrode is located a short distance above the survey and focusing electrodes. In this electrode arrangement, when the survey and focusing electrodes are adjacent a conductive earth strata and the current return electrode is adjacent a highly resistive earth strata, the survey and focusing current will set up a high negative potential on the current return electrode caused by the survey and focusing current returning to the current return electrode through the highly resistive earth strata from infinity. This high negative potential on the current return electrode will set up a negative potential on the potential reference electrode, which potential may be as high as the potential on the survey and focusing electrodes, thus introducing a very substantial error in the resistivity or conductivity measurements.

It is an object of the invention therefore to provide new and improved methods and apparatus for measuring the electrical resistance properties of earth formations adjacent a borehole.

It is another object of the invention to provide new and improved borehole investigating methods and apparatus of the "focused" type for providing more accurate measurements of current flow in a subsurface earth formation.

It is a further object of the invention to provide new and improved borehole investigating methods and apparatus of the "focused" type wherein a more accurate reference voltage is maintained within a downhole electrical circuitry.

It is still a further object of the invention to provide new and improved borehole investigating methods and apparatus of the "focused" type in which a more accurate reference voltage is maintained in a downhole electrical circuitry under extreme borehole conditions and the earth formations surrounding the bottom portion of the borehole may also be investigated.

In accordance with the present invention, methods and apparatus for investigating earth formations comprise moving an electrode array through the borehole and supplying current to at least one current emitting electrode for emission into the surrounding formations, the emitted current returning to a first current return electrode located above the current emitting electrode. The current return path is then switched from the first current return electrode to a second current return electrode located below the current emitting electrode. In carrying out the method of the present invention, the first current return electrode is utilized for investigating the formations from the terminal end of the borehole to a point thereabove. Then, the lower current return electrode is utilized for returning the emitted current so as to investigate the formations surrounding the remainder of the borehole. To investigate this terminal end portion of the borehole, the lower current return electrode can be held in a close proximity position to the current emitting electrode and then released when the current emitting electrode is a sufficient interval from the terminal end of the borehole.

In accordance with another feature of the invention, apparatus for investigating earth formations where a remote potential reference electrode is coupled to the downhole investigating electrical circuitry to provide a reference voltage approximating zero volts comprises a plurality of electrodes adapted for movement through the borehole, the electrodes including: a survey electrode adapted for emitting survey current into the surrounding earth formations for investigation thereof, at least one focusing electrode located in close proximity to the survey electrode and adapted for emitting focusing current for confining the survey current to a desired flow pattern, a current return electrode located below the survey and focusing electrodes, and the remote potential reference electrode located above the survey and focusing electrodes. The apparatus further includes means for supplying current to the survey and focusing electrodes, and means coupled to the current return electrode for returning the current emitted from the survey and focusing electrodes back to the current supplying means.

For a better understanding of the present invention, together with other and further objects thereof, reference is had to the following description taken in connection with the accompanying drawing, the scope of the invention being pointed out in the appended claims.

The single figure of the drawing illustrates a representative embodiment of the earth formation investigating apparatus of the present invention in the borehole together with a schematic diagram of the electrical circuitry utilized with such embodiment.

Referring to the drawing, there is shown a representative embodiment of apparatus constructed in accordance with the present invention for investigating subsurface earth formations 10 traversed by a borehole 11. Borehole 11 is filled with an electrically conductive drilling fluid 13, commonly referred to as "drilling mud." The investigating apparatus includes an electrode array 14, including survey and focusing electrodes $A_0$ and $A_1$, and a fluid-tight housing 15 located in the hollow interior of the electrodes, which contains the electrical circuitry. The dotted line enclosure 15 represents a portion of the fluid-tight housing 15 blown up to a size such that the electrical circuitry may be represented therein. Of course, the actual size of the fluid-tight housing is represented by the solid portion 15. The electrode array 14 and the fluid-tight housing 15 are suspended in the borehole 11 by means of an armored, multi-conductor supporting cable 12, only partially shown, which extends to the surface of the earth. The armor of the armored, multi-conductor supporting cable 12 constitutes an electrode. The lower part of the cable 12 immediately above the housing 15 is covered with electrical insulation material 12a up to a point approximately 90 feet from electrode array 14.

Located approximately 80 feet above the top of electrode array 14 is an electrode 17 fixed to cable 12 but electrically insulated therefrom. Located immediately below lower focusing electrode $A_1$ of electrode array 14 is an electrode 24. Attached between electrode 24 and housing unit 15 is a cable 26 coiled above electrode 24. A finger 48 adapted to be actuated by solenoid 47 holds electrode 24 in place. When solenoid 47 is actuated, electrode 24 is enabled to fall free for the length of cable 26, which is approximately 20 feet, as shown by the dotted line 26. Electrode 24, coiled cable 26, solenoid 47, and finger 48 are all located within the hollow interior of the bottom portion of housing unit 15.

The conductors which supply the power to the downhole electrical circuitry and the conductors which carry the measurements to the surface are enclosed within the cable 12. The conductors shown running to the surface of the earth, such as conductors 49 and 50, are actually contained within the cable 12, but shown outside the cable 12 for purposes of clarity of the electrical circuit. This cable 12 is connected to a suitable winch mechanism located at the surface of the earth, which raises and lowers the downhole investigating equipment. A recorder 16, which may be, for example, the type shown in U.S. Patent No. 3,181,056, granted to E. H. Boissonas on April 27, 1965, shown at the surface of the earth, has associated therewith a suitable driving mechanism (not shown) which is coupled to the armored supporting cable 12 for advancing the recording medium in step with movement of the downhole apparatus through the borehole 11.

Electrode array 14 has a survey electrode $A_0$ for emitting survey current into the adjacent earth formations and focusing electrodes $A_1$ for emitting focusing current into the adjacent earth formations to confine the survey current to a path substantially perpendicular to the borehole axis for an appreciable distance. The focusing electrodes $A_1$ of electrode array 14 are connected together by a wire 18 so that both focusing electrodes $A_1$ on either side of survey electrode $A_0$ will be at the same potential.

The investigating apparatus also includes an oscillator 19 which provides a reference voltage to a reference resistor 21 which reference voltage is supplied to one side of primary winding 25 of a transformer 22. The other side of reference resistor 21 is connected to common terminal 61 of double throw switch 60. The normally closed contact 63 of switch 60 is connected to electrode 17. The normally open contact 62 of switch 60 is connected to the armor of armored multi-conductor cable 12. The other side of the primary winding 25 of transformer 22 is connected to focusing electrode $A_1$.

Secondary winding 23 of transformer 22 is connected to the input of a constant voltage amplifier 20. The output of constant voltage amplifier 20 is connected to a transformer 27, one side of the secondary winding 28 of which is connected to focusing electrode $A_1$. The other side of secondary winding 28 is connected to common terminal 29 of a double throw switch 36. The normally closed contact 43 of switch 36 is connected to the armor of armored multi-conductor cable 12. The normally open contact 34 of switch 36 is connected to electrode 24 below electrode array 14. Switch 36 is actuated by relay solenoid 58 which is energized by power source 57 through switch 52 at the surface of the earth. This power is supplied through conductors 49 and 50 within cable 12, which conductors also supply the power to solenoid 47. The connections to the electrodes of FIG. 1 are actually made by conductors within cable 12, but are shown as direct connections from the electrical schematic for purposes of electrical circuitry.

The investigating apparatus also includes an amplifier 31, the output of which is connected to a transformer 32. One side of the secondary winding 33 of transformer 32 is connected to focusing electrode $A_1$. The other side of secondary winding 33 of transformer 32 is connected to one side of measure resistor 35. The other side of measure resistor 35 is connected to survey electrode $A_0$. Also connected across measure resistor 35 is transformer 55, the secondary winding 56 of which is connected to the input of measure amplifier 37. One output from measure amplifier 37 and an output from oscillator 19 are supplied to phase-sensitive detector 38. The other output of measure amplifier 37 is supplied to adding network 39. Also supplied to adding network 39 is the output signal from monitor amplifier 40. The output of adding network 39 is supplied to the input of amplifier 31. The input of monitor amplifier 40 is supplied from transformer 41. One side of the primary winding 42 of transformer 41 is connected to focusing electrode $A_1$ and the other side of primary winding 42 is connected to survey electrode $A_0$.

The output from phase-sensitive detector 38 is supplied via leads 45 and 46 through armored, multi-conductor cable 12 to recorder 16 at the surface of the earth.

Now concerning the operation of the embodiment of the present invention shown in the drawing, survey current is emitted from a central survey electrode $A_0$ and confined to a desired lateral flow pattern by focusing current emitted from focusing electrodes $A_1$ on either side of survey electrode $A_0$. In the present embodiment, the voltage magnitudes of the survey and focusing electrodes of one electrode array are maintained equal and of constant magnitude, and the variations of the current supplied to survey electrode $A_0$ of the same electrode array are measured.

Oscillator 19 provides an AC signal of constant voltage magnitude across reference resistor 21, which voltage is the constant reference voltage for the operation of the system. This constant reference voltage is applied to one side of the primary winding 25 of transformer 22. Applied to the other side of the primary winding 25 is the voltage on focusing electrode $A_1$. A signal proportional to the potential difference between the two input voltages applied to primary winding 25 is induced into secondary winding 23 of transformer 22 and applied to constant voltage amplifier 20. Constant voltage amplifier 20 provides an output voltage to transformer 27 which is indicative of the voltage difference between the two applied input voltages. This voltage is induced across the secondary winding 28 of transformer 27 and applied between the focusing electrode $A_1$ and the current return electrode, which is either the armor of armored multi-conductor cable 12 above housing unit 15 or electrode 24 below housing unit 15, depending on the position of switch 36.

Thus, constant voltage amplifier 20 will provide current to focusing electrode $A_1$ of sufficient magnitude to maintain a substantially zero potential difference between the two input voltages applied to the primary winding 25 of transformer 22, that is, the voltage on focusing electrode $A_1$ and the constant reference voltage supplied from oscillator 19. Thus, it can be seen that through this feedback action, the voltage applied to focusing electrode $A_1$ of electrode array 13 will be substantially the same as the reference voltage supplied from oscillator 19, which is the voltage developed across reference resistor 21.

The purpose of the circuitry comprising transformer 41, monitor amplifier 40, adding network 39, amplifier 31, transformer 32, and measure resistor 35, transformer 55, measure amplifier 37 back through adding network 39, is to provide a current to survey electrode $A_0$ of such magnitude as to maintain a substantially zero potential difference between survey electrode $A_0$ and focusing electrode $A_1$. The potential difference between the survey and focusing electrodes $A_0$ and $A_1$ is supplied to transformer 41, and then to monitor amplifier 40. Monitor amplifier 40 provides an output voltage indicative of the potential difference between survey and focusing electrodes $A_0$ and $A_1$, which voltage is fed to adding network 39. The output voltage from adding network 39 is supplied to amplifier 31. The output voltage from amplifier 31 is supplied to transformer 32, which develops a voltage between survey electrode $A_0$, through measure resistor 35, and focusing electrode $A_1$. The voltage developed across measure resistor 35 is supplied through transformer 55 to measure amplifier 37, whose output is supplied back to adding network 39. Adding network 39 acts to isolate monitor amplifier 40 and measure amplifier 37 from one another as well as combining the two applied inputs.

Thus, it can be seen that monitor amplifier 40 monitors the difference in potential between survey electrode $A_0$ and focusing electrode $A_1$ and supplies a signal indicative of this potential difference to adding network 39. A voltage is supplied through amplifier 31, transformer 32 and measure resistor 35 between survey electrode $A_0$ and focusing electrode $A_1$ of such magnitude as to reduce the potential difference between electrodes $A_0$ and $A_1$ substantially to zero. As seen by the polarity markings across the secondary windings 28 and 33 of transformers 27 and 32 respectively, the voltage supplied to survey electrode $A_0$ from transformer 32 is in adding relationship to the voltage supplied to focusing electrode $A_1$, since there is some resistance associated with secondary winding 33 of transformer 32 causing some voltage loss therethrough from the voltage on focusing electrode $A_1$.

The current through measure resistor 35 is the total current supplied to survey electrode $A_0$, and as such, is the current to be measured to provide an indication of, in this case, conductivity since the voltage is being held constant. This survey current develops a voltage across measure resistor 35 which voltage is induced in the secondary winding 56 of transformer 55, and amplified by measure amplifier 37. Phase-sensitive detector 38 receives a phase reference signal from oscillator 19 and detects the component of voltage from measure amplifier 37 which is in phase with this applied reference signal, providing a DC signal proportional to this amount via conductors 45 and 46 to recorder 16 at the surface of the earth. The output voltage from measure amplifier 37 is also supplied to adding network 39 to offset the voltage loss due to measure resistor 35. This positive feed-back network through measure amplifier 37 lessens the gain requirements on the negative feed-back loop through monitor amplifier 40.

For a further explanation of the feed-back circuits associated with amplifier 31, see U.S. Patent No. 3,031,612 granted to M. F. Easterling on Apr. 24, 1962.

It can now be seen that the reference voltage supplied from oscillator 19 must be constant so that the voltage supplied to the survey and focusing electrodes $A_0$ and $A_1$ of the investigating electrode array can also be constant, since the accuracy of the current variation measurements across measure resistor 35 assumes a constant voltage on survey electrode $A_0$. However, if the voltage of the potential reference electrode N varies, the reference voltage applied to the survey and focusing electrodes $A_0$ and $A_1$ will also vary, since the reference voltage is determined with respect to potential reference electrode N. Variations of the voltage on the potential reference electrode N may result from the voltage gradient caused by the survey and focusing electrodes or the current return electrode. Thus, it is undesirable to locate the potential reference electrode N too close to either the survey and focusing emitting or current return electrodes because of this voltage gradient. If the potential reference electrode N is placed a great distance below the survey electrode, it becomes difficult to investigate the bottom of the borehole and if placed a great distance above, the mutual inductance between conductors becomes a serious problem.

This voltage gradient problem becomes especially acute under certain adverse borehole conditions, as for example, when some layers of earth strata surrounding a borehole have high resistivity values. Under these adverse borehole conditions, a focused type of investigating system is required to force the survey current outward into the surrounding earth formations. Because of the high resistivity of the surrounding earth formations, the survey current from a non-focused system would not penetrate laterally into the surrounding earth formations but would travel through the mud in the borehole, thus giving the resistivity of the mud rather than the surrounding earth formations.

In a focused type system, it has been found that it is desirable to place the potential reference electrode N a prescribed distance above the other electrodes of the investigating system. This prescribed distance must be great enough so that the potential reference electrode will not be so close to the other electrodes of the investigating system as to be influenced by the voltages thereon and yet not so great as to have appreciable undesired voltages induced in the conductor connecting the potential reference electrode N with the downhole electrical circuitry. It has been found that a distance of approximately 80 to 100 feet meets these requirements. In addition, it has been found that if the potential reference electrode is placed on the armor of armored, multi-conductor cable 12 running to the surface of the earth, the potential reference electrode will be in closer contact with infinity. However, problems may still arise under the above-mentioned adverse borehole conditions when the current return electrode is mounted between the potential reference electrode and the survey and focusing electrodes or the potential reference electrode is located between the survey and focusing emitting and return electrodes.

When the survey and focusing electrodes $A_0$ and $A_1$ are opposite a conductive earth strata and the current return electrode is opposite a highly resistive earth strata, the current emitted from the survey and focusing electrodes $A_0$ and $A_1$ will travel to infinity through the conductive earth strata causing a relatively high current flow and the same current will return to the current return electrode from infinity. This survey and focusing current returning from infinity to the current return electrode through a highly resistive earth strata will set up a large negative potential on the current return electrode. If the current return electrode is located between survey and focusing electrodes $A_0$ and $A_1$ and potential reference electrode N or near potential reference electrode N, this high negative potential will cause a negative potential to exist on potential reference electrode N, the magnitude of this potential reference partly dependent on the distance that potential reference electrode N is from the current return electrode. However, as stated before, potential reference electrode N cannot be too far from the current return electrode because of the induced voltage on the conductor connecting potential reference electrode N with the downhole electrical circuitry, which conductor runs through armored, multi-conductor cable 12.

However, it has been discovered that if the current return electrode is located on the opposite side of survey and focusing electrodes $A_0$ and $A_1$ from potential reference electrode N, the survey and focusing electrodes $A_0$ and $A_1$ will, in effect, shield potential reference electrode N from the current return electrode. Since the survey and focusing electrodes $A_0$ and $A_1$ remain at a constant potential, relatively low in comparison to the potential which may exist on the current return electrode under the above-described adverse borehole conditions, there will be very little, if any, potential on remote potential reference electrode N due to survey and focusing electrodes $A_0$ and $A_1$, even under these extreme borehole conditions. It has been found after a great amount of experimentation that if the current return electrode B is placed approximately 20 feet from the nearest point on focusing electrode $A_1$ to B, the desired amount of focusing action is obtained and the downhole investigating equipment is easy to handle.

However, if the current return electrode is located below survey and focusing electrodes $A_0$ and $A_1$, the portion of the earth formation surrounding the bottom of the borehole cannot be investigated. To solve this problem, electrode 24 is kept within the housing unit 15 for logging the earth formations surrounding the bottom portion of the borehole and the armor of armored multi-conductor cable 12 above housing unit 15 is utilized as the current return electrode B and electrode 17 between housing unit 15 and the bare armor of armored multi-conductor cable 12 is utilized as the potential reference electrode N, which electrode configuration is a conventional electrode configuration as shown in U.S. Patent 2,933,674 granted to N. A. Schuster on April 19, 1960. As soon as the electrode array 14 clears the bottom of the borehole by the length of cable 26, switch 52 at the surface of the earth is closed, thus allowing generator 57 to energize solenoid 47, pulling finger 48 away from electrode 24. This allows electrode 24 to fall free from housing unit 15 for the length of cable 26. Electrode 24, to be used as the current return electrode, must be at a sufficient distance from electrode array 14 to enable the survey and focusing currents to penetrate laterally into the surrounding earth formations for a sufficient distance, which distance is the length of cable 26.

Thus, electrode 24 remains within housing unit 15 while the investigating equipment is being lowered into the borehole and until electrode array 14 is a certain distance above the bottom of the borehole. At this time, switch 52 is closed, dropping electrode 24 from housing unit 15, and energizing relay 58 which switches the current return point from the armor of armored multi-conductor cable 12 above electrode array 14 to electrode 24 below electrode array 14 and, at the same time, switches the potential reference electrode N from electrode 17 to the armor of armored multi-conductor cable 12. In this manner, the voltage on the potential reference electrode N can be maintained substantially constant, at zero volts, for most of the survey even under extreme borehole conditions and yet the earth formations surrounding the bottom portion of the borehole may also be investigated.

It is to be understood that the particular type of focused electrode system shown as electrode array 14 in FIG. 1 is only illustrative and electrode array 14 could comprise any other type of focused electrode system, as for example, the 7 electrode focused configuration shown in FIG. 1 of U.S. Patent No. 3,034,041 granted to N. A. Schuster on May 8, 1962.

While there has been described what is at present considered to be a preferred embodiment of this invention, it will be obvious to those skilled in the art that various changes and modifications may be made therein without departing from the invention, and it is, therefore, intended to cover all such changes and modifications

What is claimed is:

1. In apparatus for investigating earth formations traversed by a borehole, the combination comprising:
   (a) a plurality of electrodes adapted for movement through the borehole, the electrodes including:
      (1) an electrode array adapted for emitting current into the surrounding earth formations;
      (2) a first current return electrode located below the current emitting electrode array;
      (3) a second current return electrode located above the current emitting electrode array;
   (b) means for supplying current to the current emitting electrode array;
   (c) means coupled only to the second current return electrode for returning the current emitted by the current emitting electrode array back to the current supplying means; and
   (d) means for switching the current being returned from the second current return electrode to being returned from only the first current return electrode back to the current supplying means.

2. In apparatus for investigating earth formations traversed by a borehole, the combination comprising:
   (a) a plurality of electrodes adapted for movement through the borehole, the electrodes including:
      (1) a survey electrode adapted for emitting survey current into the surrounding earth formations for investigation thereof;
      (2) at least one focusing electrode located in close proximity to the survey electrode and adapted for emitting focusing current for confining the survey current to a desired flow pattern;
      (3) a first current return electrode located below the survey and focusing electrodes;
      (4) a second current return electrode located above the survey and focusing electrodes;
   (b) means for supplying current to the survey and focusing electrodes;
   (c) means coupled only to the second current return electrode for returning the current emitted by the survey and focusing electrodes back to the current supplying means; and
   (d) means for switching the current being returned from the second current return electrode to being returned only from the first current return electrode back to the current supplying means.

3. In apparatus for investigating earth formations traversed by a borehole, the combination comprising:
   (a) a plurality of electrodes adapted for movement through the borehole, the electrodes including:
      (1) a survey electrode adapted for emitting survey current into the surrounding earth formations for investigation thereof;
      (2) at least one focusing electrode located in close proximity to the survey electrode and adapted for emitting focusing current for confining the survey current to a desired flow pattern;
      (3) a first current return electrode held in close proximity below the survey and focusing electrodes;
      (4) a second current return electrode located above the survey and focusing electrodes;
   (b) means for supplying current to the survey and focusing electrodes;
   (c) means coupled only to the second current return electrode for returning the current emitted by the survey and focusing electrodes back to the current supplying means for investigating the bottom portion of the borehole;
   (d) means for releasing the first current return electrode from the close proximity position below the survey and focusing electrodes to enable the first current return electrode to fall a fixed distance below the survey and focusing electrodes when the survey and focusing electrodes are a sufficient interval from the bottom of the borehole; and
   (e) means for switching the current being returned from the second current return electrode to being returned only from the first current return electrode back to the current supply means for investigating the remainder of the borehole.

4. In apparatus for investigating earth formations traversed by a borehole where a remote potential reference electrode is coupled to the downhole investigating electrical circuitry to provide a reference voltage approximating zero volts, the combination comprising:
   (a) a plurality of electrodes adapted for movement through the borehole, the electrodes including:
      (1) a survey electrode adapted for emitting survey current into the surrounding earth formations for investigation thereof;
      (2) at least one focusing electrode located in close proximity to the survey electrode and adapted for emitting focusing current for confining the survey current to a desired flow pattern;
      (3) a current return electrode located below the survey and focusing electrodes;
      (4) the remote potential reference electrode located above the survey and focusing electrodes;
   (b) means for supplying current to the survey and focusing electrodes; and
   (c) means coupled only to the current return electrode for returning the current emitted from the survey and focusing electrodes back to the current supplying means whereby the survey and focusing electrodes are intermediate of the remote potential reference electrode and the current return electrode to substantially minimize the effect of the current return electrode on the potential reference electrode.

5. In apparatus for investigating earth formations traversed by a borehole where a remote potential reference electrode is coupled to the downhole investigating electrical circuitry to provide a reference voltage approximating zero volts, the combination comprising:
   (a) a plurality of electrodes adapted for movement through the borehole, the electrodes including:
      (1) a survey electrode adapted for emitting survey current into the surrounding earth formations for investigation thereof;
      (2) at least one focusing electrode located in close proximity to the survey electrode and adapted for emitting focusing current for confining the survey current to a desired flow pattern;
      (3) a first current return electrode located below the survey and focusing electrodes;
      (4) a second current return electrode located above the survey and focusing electrodes;
      (5) the remote potential reference electrode located above the survey and focusing electrodes;
   (b) means for supplying current to the survey and focusing electrodes;
   (c) means coupled only to the second current return electrode for returning the current emitted from the survey and focusing electrodes back to the current supplying means whereby the survey and focusing electrodes are intermediate of the remote potential reference electrode to substantially minimize the effect of the lower current return electrode on the remote potential reference electrode; and
   (d) means for switching the current being returned from the second current return electrode to being returned only from the first current return electrode back to the current supplying means.

6. In apparatus for investigating earth formations traversed by a borehole where a remote potential reference electrode is coupled to the downhole investigating electrical circuitry to provide a reference voltage approximating zero volts, the combination comprising:
(a) a plurality of electrodes adapted for movement through the borehole, the electrodes including:
  (1) a survey electrode adapted for emitting survey current into the surrounding earth formations for investigation thereof;
  (2) at least one focusing electrode located in close proximity to the survey electrode and adapted for emitting focusing current for confining the survey current to a desired flow pattern;
  (3) a first current return electrode held in close proximity below the survey and focusing electrodes;
  (4) a second current return electrode located above the survey and focusing electrodes;
  (5) the remote potential reference electrode located above the survey and focusing electrodes;
(b) means for supplying current to the survey and focusing electrodes;
(c) means coupled to the second current return electrode for returning the current emitted from the survey and focusing electrodes back to the current supplying means;
(d) means for releasing the first current return electrode from the close proximity position below the survey and focusing electrodes to enable the first current return electrode to fall a fixed distance below the survey and focusing electrodes; and
(e) means for switching the current being returned from the second current return electrode to being returned from the first current return electrode back to the current supplying means.

7. In apparatus for investigating earth formations traversed by a borehole, the combination comprising:
(a) a plurality of electrodes adapted for movement through the borehole, the electrodes including;
  (1) a survey electrode adapted for emitting survey current into the surrounding earth formations for investigating thereof;
  (2) at least one focusing electrode located in close proximity to the survey electrode and adapted for emitting focusing current for confining the survey current to a desired flow pattern;
  (3) a current return electrode located below the survey and focusing electrodes;
  (4) a remote potential reference electrode located above the survey and focusing electrodes;
(b) means for supplying current to the survey and focusing electrodes;
(c) means coupled to the current return electrode for returning the current emitted from the survey and focusing electrodes back to the current supplying means; and
(d) means coupled to the potential reference electrode for maintaining the voltage on the survey and focusing electrodes substantially constant with respect to the voltage on the potential reference electrode whereby the substantially constant voltage survey and focusing electrodes electrically shields the remote potential reference electrode from the current return electrode.

8. In apparatus for investigating earth formations traversed by a borehole, the combination comprising:
(a) a plurality of electrodes adapted for movement through the borehole, the electrodes including:
  (1) a survey electrode adapted for emitting survey current into the surrounding earth formations for investigation thereof;
  (2) at least one focusing electrode located in close proximity to the survey electrode and adapted for emitting focusing current for confining the survey current to a desired flow pattern;
  (3) a current return electrode located below the survey and focusing electrodes;
  (4) a remote potential reference electrode located above the survey and focusing electrodes;
(b) means for supplying current to the survey and focusing electrodes;
(c) means coupled to the current return electrode for returning the current emitted from the survey and focusing electrodes back to the current supplying means;
(d) means coupled to the potential reference electrode for providing an output voltage in response to the voltage difference between the focusing electrode and the potential reference electrode; and
(e) means responsive to the output voltage from the last-named means for maintaining the voltage on the survey and focusing electrodes substantially constant with respect to the voltage on the potential reference electrode whereby the substantially constant voltage survey and focusing electrodes electrically shields the remote potential reference electrode from the current return electrode.

9. A method of investigating earth formations traversed by a borehole comprising the steps of:
moving a plurality of electrodes through the borehole to the terminal end of the borehole;
supplying current to at least one current emitting electrode from a current supplying means for emission into the surrounding earth formations, the current returning to a first current return electrode located above said at least one current emitting electrode for investigating the formations from the terminal end of the borehole to a selected point thereabove;
returning the current from the first current return electrode to the current supplying means;
releasing a second current return electrode from a close proximity position below said at least one current emitting electrode when said current emitting electrode is a desired interval above the terminal end of the borehole to enable the second current return electrode to fall a fixed distance below said at least one current emitting electrode; and
switching the current being returned from the first current return electrode to being returned from the second current return electrode back to the current supplying means for investigating the formations above the selected point in the borehole whereby the current emitting electrode minimizes the effect of the lower current return electrode on the formations above the current emitting electrodes yet the terminal end of the borehole can be investigated before the lower current return electrode is released by utilizing the upper current return electrode.

10. A method of investigating earth formations traversed by a borehole comprising the steps of:
lowering a plurality of electrodes through the borehole to the terminal end thereof;
supplying current to at least one current emitting electrode from a current supplying means for emission into the surrounding formations, the emitted current returning to a first current return electrode above said at least one current emitting electrode for return to the current supplying means for investigating the formations from the terminal end of the borehole to a point thereabove; and
switching the current being returned from the first current return electrode above said at least one current emitting electrode to being returned from a second current return electrode below said at least one current emitting electrode when said at least one current emitting electrode is at a selected point above the terminal end of the borehole, for investigating the formations surrounding the remainder of the borehole, whereby the current emitting electrode will minimize the effect of the lower current return electrode on the formations above the current emitting electrode.

11. A method of investigating earth formations traversed by a borehole with investigating apparatus of the type where a remote potential reference electrode supplies a reference potential approximating zero volts to downhole investigating apparatus, comprising the steps of:

lowering a plurality of electrodes through the borehole to the terminal end thereof;

supplying current to at least one current emitting electrode, located below the potential reference electrode, from a current supplying means for emission into the surrounding formations, the emitted current returning to a first current return electrode above said at least one current emitting electrode for return to the current supplying means for investigating the formations from the terminal end of the borehole to a selected point thereabove;

maintaining the voltage of said at least one current emitting electrode constant with respect to the remote potential reference electrode; and switching the current being returned from the first current return electrode above said at least one current emitting electrode to being returned from a second current return electrode below said at least one current emitting electrode when said at least one current emitting electrode is at a selected position in the borehole for investigating the formations above the selected point in the borehole whereby said at least one current emitting electrode electrically shields the remote potential reference electrode from the lower current return electrode.

12. A method of investigating earth formations traversed by a borehole with investigating apparatus of the type where a remote potential reference electrode supplies a reference potential approximating zero volts to the downhole investigating apparatus, comprising the steps of:

lowering a plurality of electrodes through the borehole to the terminal end thereof;

supplying current to at least one current emitting electrode, located below the potential reference electrode, from a current supplying means for emission into the surrounding formations for investigating the formations from the terminal end of the borehole to a selected point thereabove, the emitted current returning to a first current return electrode above said at least one current emitting electrode for return to the current supplying means;

maintaining the voltage of said at least one current emitting electrode constant with respect to the remote potential reference electrode;

releasing a second current emitting electrode from a close proximity position below said at least one current emitting electrode when said current emitting electrode is a desired interval above the terminal end of the borehole to enable the second current return electrode to fall a fixed distance below said at least one current emitting electrode; and switching the current being returned from the first current return electrode above said at least one current emitting electrode to being returned from the second current return electrode below said at least one current emitting electrode upon the second current return electrode being released for investigating the formations surrounding the remainder of the borehole whereby the constant voltage electrode electrically shields the remote potential reference electrode from the lower current return electrode yet the bottom portion of the borehole can be investigated before the second current return electrode is released.

13. In apparatus for investigating earth formations traversed by a borehole, the combination comprising:

(a) a plurality of electrodes adapted for movement through the borehole, the electrodes including:
  (1) a survey electrode adapted for emitting survey current into the surrounding earth formations for investigation thereof;
  (2) at least one focusing electrode located in close proximity to the survey electrode and adapted for emitting focusing current for confining the survey current to a desired flow pattern;
  (3) a first current return electrode held in close proximity below the survey and focusing electrodes;
  (4) a second current return electrode located above the survey and focusing electrodes;
  (5) a remote potential reference electrode located above the survey and focusing electrodes;

(b) means for supplying current to the survey and focusing electrodes;

(c) means coupled to the second current return electrode for returning the current emitted from the survey and focusing electrodes back to the current supplying means;

(d) means coupled to the potential reference electrode for maintaining the voltage on the survey and focusing electrodes substantially constant with respect to the voltage on the potential reference electrode;

(e) means for releasing the first current return electrode from the close proximity position below the survey and focusing electrodes to enable the first current return electrode to fall a fixed distance below the survey and focusing electrodes; and (f) means for switching the current returning means from the second current return electrode to the first current return electrode whereby the substantially constant voltage survey and focusing electrodes electrically shield the remote potential reference electrode from the first current return electrode yet the bottom portion of the borehole may be investigated by utilizing the second current return electrode for returning the emitted current.

References Cited

UNITED STATES PATENTS

| | | | |
|---|---|---|---|
| 2,349,366 | 5/1944 | Moon. | |
| 2,704,347 | 3/1955 | Doll | 324—10 |
| 2,712,630 | 7/1955 | Doll | 324—10 X |
| 2,729,783 | 1/1956 | Piety | 324—10 X |
| 2,754,475 | 7/1956 | Norelius | 324—10 X |
| 2,880,389 | 3/1959 | Ferre et al. | 324—1 |
| 3,103,626 | 9/1963 | Burton et al. | 324—1 |
| 3,262,050 | 7/1966 | Threadgold et al. | 324—10 |

RUDOLPH V. ROLINEC, *Primary Examiner.*

ARCHIE R. BORCHELT, *Examiner.*

G. R. STRECKER, *Assistant Examiner.*